(12) United States Patent
Ishida

(10) Patent No.: US 11,543,949 B2
(45) Date of Patent: Jan. 3, 2023

(54) INFORMATION PROCESSING APPARATUS AND INFORMATION PROCESSING METHOD

(71) Applicant: CANON KABUSHIKI KAISHA, Tokyo (JP)

(72) Inventor: Tomoya Ishida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/392,493

(22) Filed: Aug. 3, 2021

(65) Prior Publication Data
US 2022/0004309 A1    Jan. 6, 2022

Related U.S. Application Data

(63) Continuation of application No. 15/873,137, filed on Jan. 17, 2018, now Pat. No. 11,106,340.

(30) Foreign Application Priority Data

Jan. 31, 2017 (JP) .............. JP2017-015947

(51) Int. Cl.
*G06F 3/0481* (2022.01)
*G06F 3/04845* (2022.01)
(Continued)

(52) U.S. Cl.
CPC ........ *G06F 3/04845* (2013.01); *G06F 3/0481* (2013.01); *G06F 3/04842* (2013.01);
(Continued)

(58) Field of Classification Search
CPC .............. G06F 3/04845; G06F 3/0481; G06F 3/04842; G06F 3/04886; G06F 2203/04805; G06T 11/60; G06T 2200/24
See application file for complete search history.

(56) References Cited

U.S. PATENT DOCUMENTS 8,661,339 B2    2/2014    Weeldreyer et al.
8,677,232 B2    3/2014    Weeldreyer et al.
(Continued)

FOREIGN PATENT DOCUMENTS

JP    2001-043218 A    2/2001
JP    2002-244780 A    8/2002
(Continued)

OTHER PUBLICATIONS

Office Action (with English Translation) dated Jun. 6, 2019, issued in Japanese Patent Application No. 2017-015947.
(Continued)

*Primary Examiner* — Shen Shiau
(74) *Attorney, Agent, or Firm* — Venable LLP

(57) ABSTRACT

An information processing apparatus displays a software keyboard on a display screen, selects a template including an image area to which image data is assigned and a text area to which text data is assigned, arranges the image data in the image area of the selected template, displays a text input area for inputting text corresponding to the text area on the screen, assigns text inputted in the text input area using the keyboard to the text area of the selected template, and displays a layout result in which the image data is arranged in the image area and the text is arranged in the text area on the screen, the text area being displayed at a predetermined position, and changes the text area of the layout result from the predetermined position to a position not overlapping with the software keyboard when the software keyboard is displayed on the screen.

13 Claims, 9 Drawing Sheets

(51) Int. Cl.
*G06T 11/60* (2006.01)
*G06F 3/04842* (2022.01)
*G06F 3/04886* (2022.01)

(52) U.S. Cl.
CPC .......... *G06F 3/04886* (2013.01); *G06T 11/60* (2013.01); *G06F 2203/04805* (2013.01); *G06T 2200/24* (2013.01)

(56) References Cited

U.S. PATENT DOCUMENTS

| | | | |
|---|---|---|---|
| 8,719,695 B2 | 5/2014 | Weeldreyer et al. | |
| 8,930,809 B2 | 1/2015 | Hikida | |
| 9,092,130 B2 | 7/2015 | Weeldreyer et al. | |
| 9,244,605 B2 | 1/2016 | Weeldreyer et al. | |
| 10,185,493 B2 | 1/2019 | Chiba et al. | |
| 10,318,034 B1 | 6/2019 | Hauenstein et al. | |
| 10,466,859 B2* | 11/2019 | Yun | G06F 3/0484 |
| 11,106,340 B2* | 8/2021 | Ishida | G06F 3/04886 |
| 2006/0031452 A1 | 2/2006 | Shiimori | |
| 2006/0033724 A1 | 2/2006 | Chaudhri et al. | |
| 2007/0171210 A1 | 7/2007 | Chaudhri et al. | |
| 2008/0082909 A1 | 4/2008 | Zuverink et al. | |
| 2009/0048000 A1 | 2/2009 | Ade-Hall | |
| 2009/0172585 A1* | 7/2009 | Sato | H04N 1/00421 715/773 |
| 2010/0070912 A1 | 3/2010 | Zaman et al. | |
| 2010/0313107 A1 | 12/2010 | Hikida | |
| 2011/0302520 A1* | 12/2011 | Yuasa | H04N 1/00413 715/773 |
| 2012/0092355 A1 | 4/2012 | Yamamoto et al. | |
| 2012/0117506 A1* | 5/2012 | Koch | G06F 3/04886 345/173 |
| 2013/0283195 A1* | 10/2013 | Bilgen | G06F 3/0485 715/767 |
| 2013/0339907 A1 | 12/2013 | Matas et al. | |
| 2014/0035823 A1* | 2/2014 | Khoe | G06F 3/04886 345/171 |
| 2014/0208263 A1 | 7/2014 | Maklouf | |
| 2014/0245223 A1 | 8/2014 | Park et al. | |
| 2014/0245229 A1 | 8/2014 | Jeon et al. | |
| 2015/0015479 A1 | 1/2015 | Cho | |
| 2015/0154676 A1 | 6/2015 | Matousek et al. | |
| 2015/0227270 A1* | 8/2015 | Yun | G06F 3/0483 715/202 |
| 2016/0132224 A1 | 5/2016 | Weeldreyer et al. | |
| 2016/0349970 A1 | 12/2016 | Everitt et al. | |
| 2017/0060414 A1* | 3/2017 | Hori | G06F 3/04886 |
| 2018/0217740 A1* | 8/2018 | Ishida | G06F 3/04845 |
| 2020/0387304 A1* | 12/2020 | Miyazawa | G06F 3/04883 |

FOREIGN PATENT DOCUMENTS

| | | |
|---|---|---|
| JP | 2006-202067 A | 8/2006 |
| JP | 2010-282365 A | 12/2010 |
| JP | 2011-254358 A | 12/2011 |
| JP | 2012-208962 A | 10/2012 |
| JP | 2014-525065 A | 9/2014 |
| JP | 2015-200977 A | 11/2015 |

OTHER PUBLICATIONS

Japanese Office Action dated Nov. 24, 2020, issued in corresponding Japanese Patent Application No. 2019-175137.

* cited by examiner

INFORMATION PROCESSING APPARATUS AND INFORMATION PROCESSING METHOD

This application is a continuation application of U.S. patent application Ser. No. 15/873,137, filed Jan. 17, 2018, which claims the benefit of Japanese Patent Application No. 2017-015947, filed Jan. 31, 2017, which is hereby incorporated by reference wherein in its entirety.

BACKGROUND OF THE INVENTION

Field of the Invention

The present invention relates to an information processing apparatus and an information processing method.

Description of the Related Art

In software to create a photo album (hereafter, called album creation software), a technique is employed that automatically creates a photo album by automatically arranging photos in template photo slots by using an automatic layout function. After a photo album is created by the automatic layout function, a user individually edits a portion with which the user is not satisfied in the created photo album. For example, in a case when a user desires to change a photo that is set in a photo slot by the automatic layout function to a different photo, the user selects the target photo slot and performs work to manually exchange the photos (images). Further, there is a photo album to which not only a photo, but also, text can be input. For example, there is a photo album in which text can be input to a text slot arranged therein.

In the case when text is input to the text slot by the album creation software, a dialog to input text (hereafter, called a text input dialog) is displayed by a user selecting the text slot. Further, in a smartphone or a tablet personal computer (PC) to which no physical keyboard is connected, in the case when a user brings a text input area within the text input dialog into focus, normally, a software keyboard is displayed from the lower side of a display panel. Then, a user inputs a character, and the like, to the text input area by using the software keyboard. Japanese Patent Laid-Open No. 2002-244780 has disclosed a technique to produce a popup display of a keyboard in accordance with a user operation.

There is a smartphone or a tablet PC in which an object for text (magnifying glass, control, and so on, to be described later) to improve usability is displayed at the time of a user performing text editing on a user interface of the software. However, depending on the display position of the text input dialog or the software keyboard, there is a possibility that usability is reduced because the above-described object extends off the display panel or overlaps the software keyboard. Japanese Patent Laid-Open No. 2002-244780 has proposed a method of controlling the display position of the software keyboard, but has not taken into consideration the usability of the object for text that is displayed separately from the keyboard.

The present invention has been made in view of the above-described problem and an object is to provide an information processing apparatus and an information processing method capable of improving usability at the time of text editing performed on a user interface.

SUMMARY OF THE INVENTION

The information processing apparatus according to the present invention is an information processing apparatus capable of newly displaying an object for text to display text in an enlarged view in accordance with a user operation, the information processing apparatus including a display control unit configured to display a text box at a predetermined position in a display area of the information processing apparatus, and a moving unit configured to move, in a case when the text box is operated, the text box from the predetermined position in a direction opposite to a direction in which the object for text is displayed with respect to the text box.

Further features of the present invention will become apparent from the following description of exemplary embodiments with reference to the attached drawings.

DESCRIPTION OF THE EMBODIMENTS

In the following, preferred embodiments of the present invention are explained in detail with reference to the attached drawings. The following embodiments are not intended to limit the present invention according to the scope of the claims and all of the combinations of the features explained in the present embodiments are not necessarily indispensable to the solution of the present invention.

First Embodiment

There is a smartphone or a tablet personal computer (PC) (hereafter, abbreviated to a tablet sometimes) in which a magnifying glass is displayed by the function of an operating system (OS) in a case when a text portion is pressed for a long time at the time of inputting text. The text portion selected by a user is enlarged and displayed within the magnifying glass. The magnifying glass may be provided by the OS or by an application. In the present embodiment, the case is explained when photo album creation software (hereafter, called photo album creation application) is run in a smartphone or a tablet in which such an OS is installed. The magnifying glass is an object for text that is displayed in the vicinity of text so that a user can easily perform operations, such as moving a caret that indicates a text input position.

Figure 1:
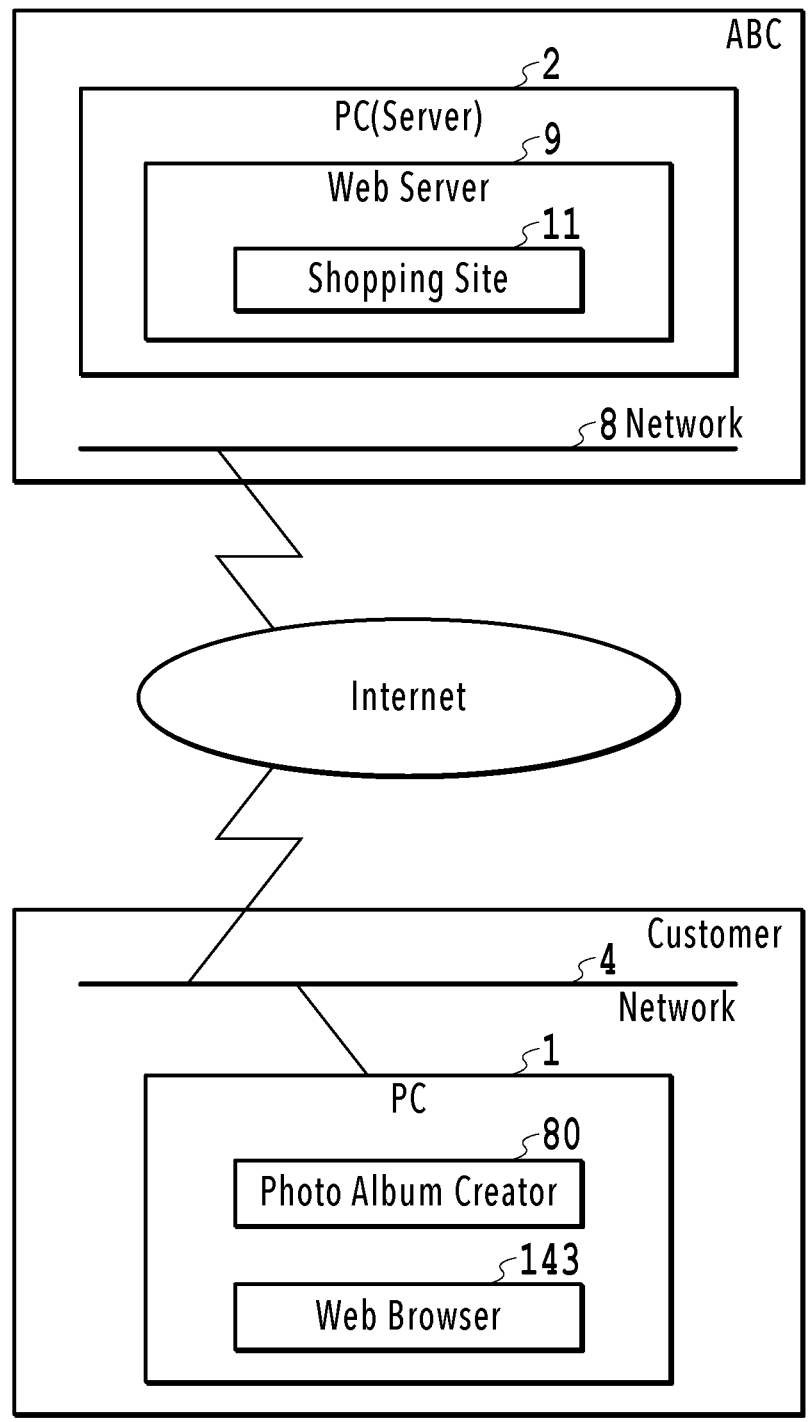
FIG. 1 is a diagram showing a configuration of a photo album creation/order system.

FIG. 1 is a diagram showing a configuration of a photo album creation/order system. The photo album creation/order system is made up by information processing apparatuses (hereafter, abbreviated to PCs sometimes) 1 and 2 being connected via a predetermined network, such as the Internet. The PCs 1 and 2 include, for example, a common personal computer, a server, and the like. In the PCs 1 and 2, as an operating system (OS), the OS equivalent to Windows 8 (registered trademark) or Windows Server 2012 (registered trademark) is installed.

The PC 1 is, for example, a smartphone or a tablet. The PC 1 can connect to a home network for common household use (a network 4 made up of Ethernet (registered trademark) shown in FIG. 1) constructed in a house of a user (for example, client (Customer), and the like). The PC 1 includes a photo album creation application (Photo Album Creator) 80 and a Web browser 143.

The Photo Album Creator 80 is an application to create a photo album and includes, for example, files in the executable format for Windows (that is, files whose extension is shown by ".exe"). The Web Browser 143 is a browser that is used at the time of making use of WWW (World Wide Web).

The PC 2 is a server that is installed within a company (in FIG. 1, within ABC company) and connected to an office network (a network 8 made up of Ethernet (registered trademark) shown in FIG. 1) constructed within the company. The PC 2 includes a Web server 9 including the function of a Web server and provides a Web site of the ABC company (that is, a shopping site 11) via the Internet. The Shopping Site 11 is a shopping site in which the ABC company provides services for users and a user can order a photo album by making use of the Shopping Site 11.

Figure 2:
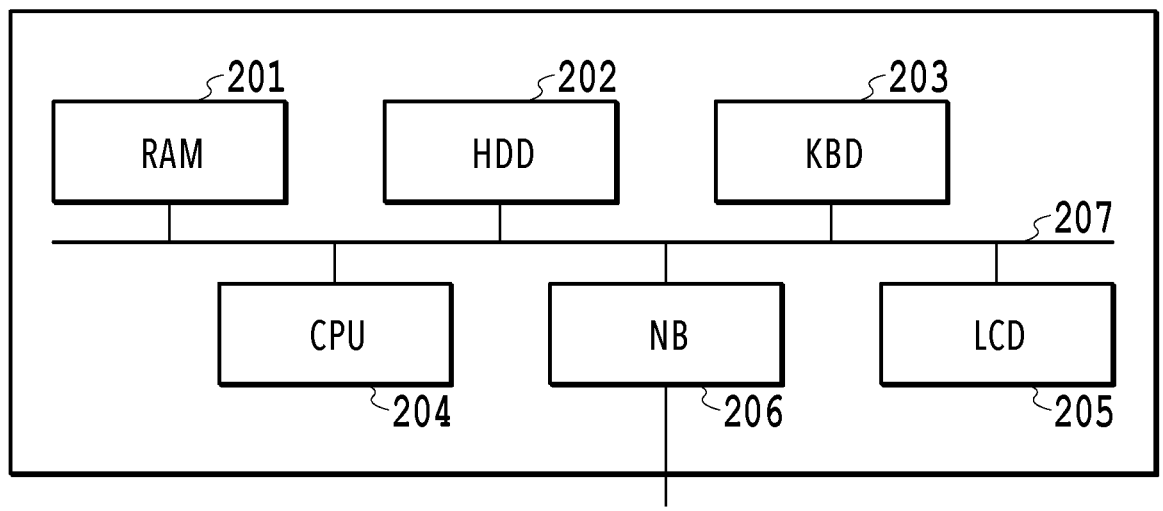
FIG. 2 is a diagram showing a hardware configuration of a personal computer (PC)

FIG. 2 is a diagram showing a hardware configuration of the PC 1. The PC 1 includes a Random Access Memory (RAM) 201, an HDD (Hard Disk Drive) 202, a keyboard (KBD) 203, a Central Processing Unit (CPU) 204, an LCD (Liquid Crystal Display) 205, and a Network Board (NB) 206. Further, in the PC 1, each component is connected to one another by a bus 207. The configuration of the PC 2 is the same as that of the PC 1, and, therefore, an explanation is omitted.

The RAM (Random Access Memory) 201 is a main memory of the CPU 204 and functions as a work area, and the like. The HDD (Hard Disk Drive) 202 is a storage device that stores various pieces of data, and the like. It is also possible to store the various pieces of data, and the like, in a portable CD-ROM, an internally installed ROM, and the like. The KBD (keyboard) 203 is an input device to input various settings. The KBD 203 may be arranged outside the PC 1. That is, it is not necessary for the PC 1 to include a keyboard.

The CPU (Central Processing Unit) 204 is a central processing unit that controls the entire PC 1 and executes various programs, such as the OS and application programs. Specifically, the CPU 204 reads the Photo Album Creator 80, the Web Browser 143, and each module (software) shown in FIG. 3 stored in the HDD 202 in accordance with the necessity and executes them. Due to this, the CPU 204 implements the functions of the Photo Album Creator 80, the Web Browser 143, and each module shown in FIG. 3.

The LCD (Liquid Crystal Display) 205 is a display device. The LCD 205 may be arranged outside the PC 1. That is, it is not necessary for the PC 1 to include a display device. The NB (Network Board) 207 is an extension board to connect to a network.

Figure 3:
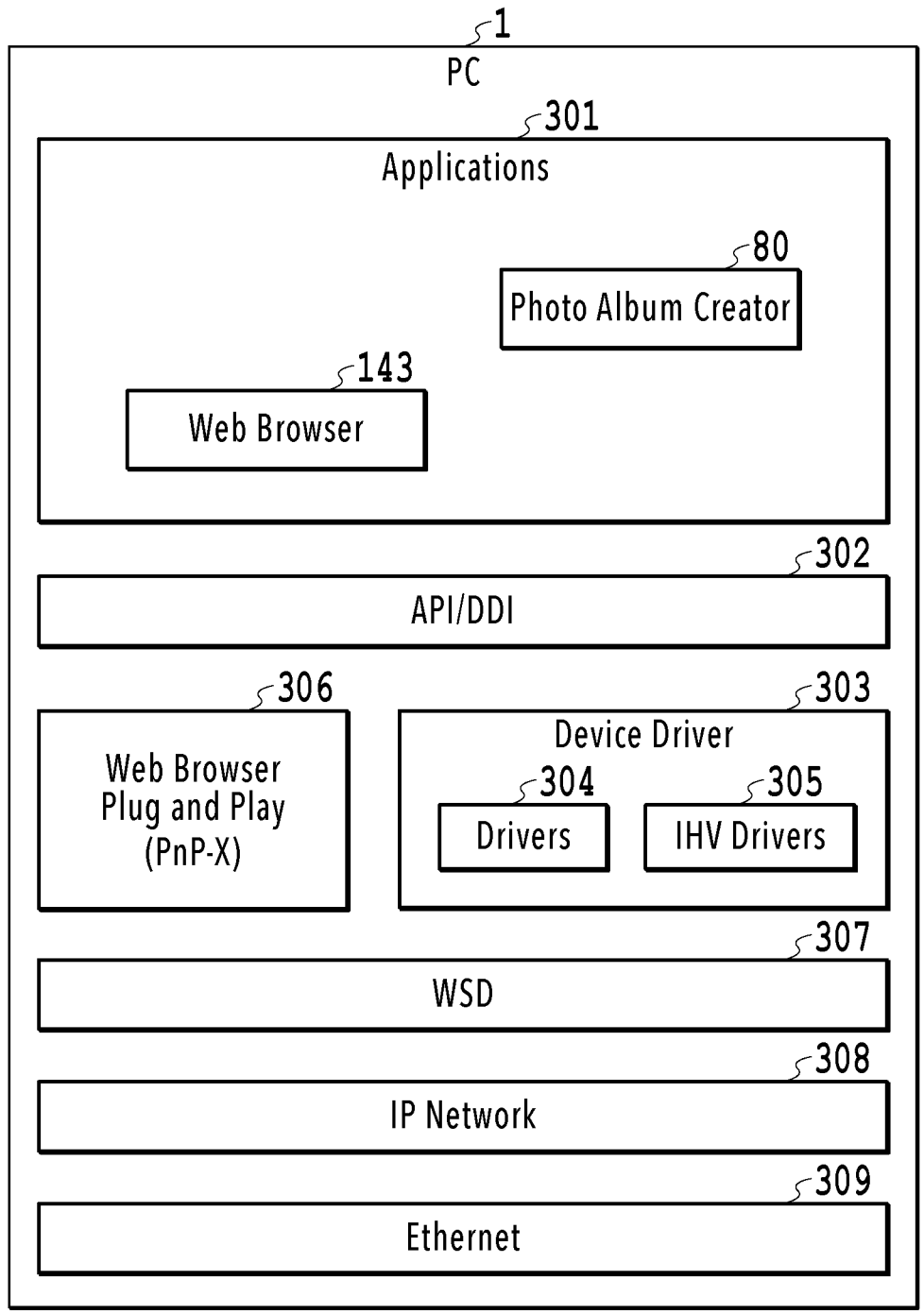
FIG. 3 is a diagram showing a software module configuration of the PC.

FIG. 3 is a diagram showing a software module configuration of the PC 1. That is, as shown in FIG. 3, the PC 1 includes modules 301 to 309. The module 301 is an application module and made up by including, for example, the Photo Album Creator 80, the Web Browser 143, and so on. The Photo Album Creator 80 performs display control processing as described in FIG. 6 and FIG. 8.

The module 302 is an API/DDI interface and made up by including an Application Programming Interface (API) and a Device Driver Interface (DDI). The module 303 is a module as a device driver. The module 303 includes standard driver group (Drivers) 304 that comes with the OS as a standard component and an IHV driver group (IHV Drivers) 305 provided by an Independent Hardware Vendor (IHV).

The module 306 is a PnP-X control module that controls network plug and play. PnP-X is an abbreviation of "Plug and Play Extensions", which is a function installed in Windows 8 as a standard series of extension functions of plug and play that provides a support for a network-connected device.

The module 307 is a WSD (Web Service on Devices) control module that controls WSD providing a mechanism of device search on a network. The module 308 is an IP Network control module that controls an IP network. The module 309 is an Ethernet control module that controls the Ethernet.

Figure 4:
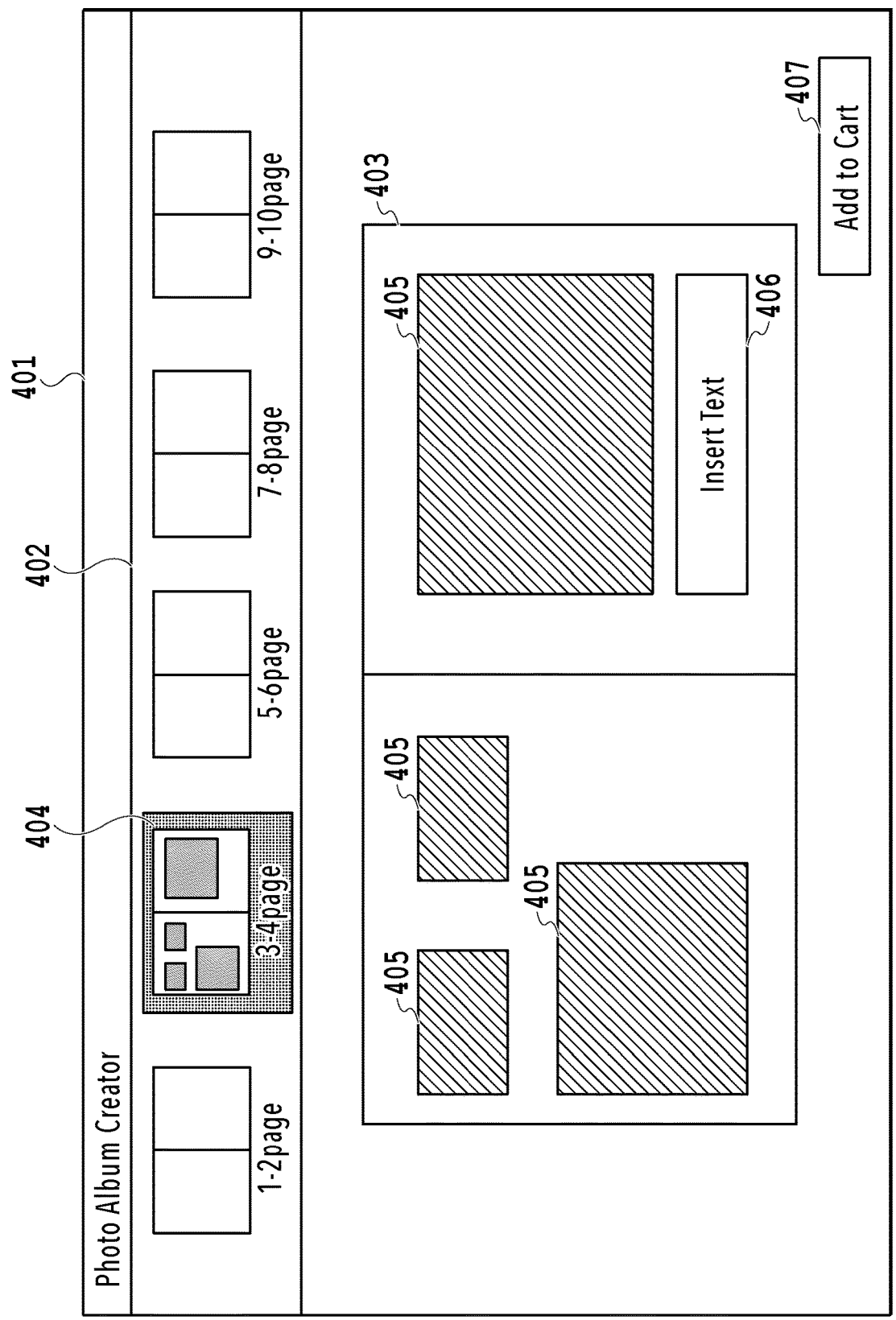
FIG. 4 is a diagram showing an example of a screen of a photo album creation application that runs on the PC.

FIG. 4 is a diagram showing an example of the screen of the Photo Album Creator 80 that runs on the PC 1. In FIG. 4, a user interface (UI) that is displayed on the LCD 205 at the time of actually editing a photo album is shown. An area 401 is a display area of the Photo Album Creator 80. An area 402 is a thumbnail display area of each page of a photo album. In the example shown in FIG. 4, a thumbnail of each two-page spread is displayed in the thumbnail display area 402. An area 403 is a photo album display area. In a case when a user selects a desired thumbnail in the thumbnail display area 402, an area (area 404 shown in FIG. 4) around the selected thumbnail is highlighted and the two-page spread corresponding to the thumbnail enters the selected state. That is, in FIG. 4, the two-page spread (third and fourth pages) is in the selected state. The two pages (in FIG. 4, third and fourth pages) corresponding to the selected thumbnail are displayed in the photo album display area 403. It is possible for a user to perform the editing operation for the pages displayed in the photo album display area 403. In the photo album display area 403 shown in FIG. 4, four photo slots 405 and one text slot (hereafter, called a text display area) 406 are arranged. The Photo Album Creator 80 automatically selects a template including the photo slots 405 and the text display area 406 and automatically lays out an image in each photo slot. It is possible to exchange the image automatically laid out in the photo slot 405 with another image in accordance with instructions of a user. Further, it is possible for a user to edit the layout of the text display area 406. That is, it is possible for a user to change the position and size of the text display area 406 on the screen in FIG. 4. It is possible to set arbitrary text in the text display area 406. That is, the text display area 406 can display arbitrary text. A button 407 is a button to put an edited photo album into a cart. By pressing the button 407, the edited photo album is uploaded to the shopping cart of the Shopping Site 11 via the Internet.

Figure 5B:
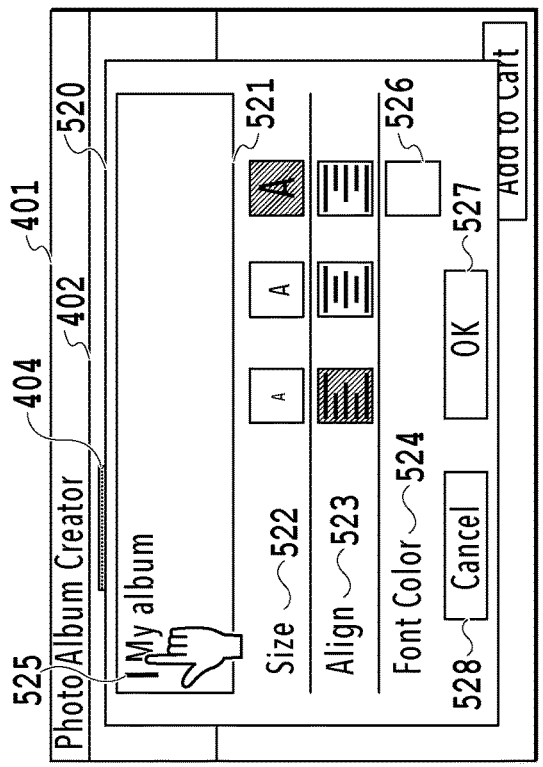
FIGS. 5A to 5D are diagrams for explaining a relationship of the display position between a magnifying glass and a software keyboard.
Figure 5A:
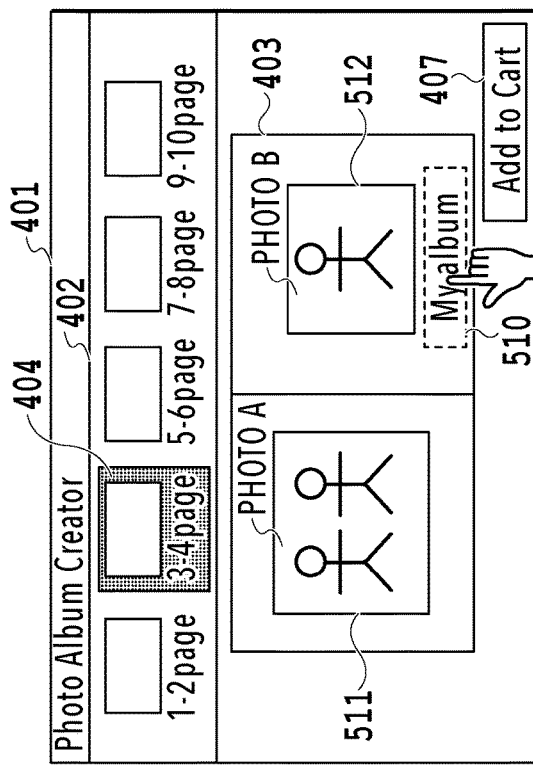

FIGS. 5A to 5D are diagrams for explaining a relationship of the display position between the magnifying glass and the software keyboard. In FIGS. 5A to 5D, the way a user inputs text to the photo album is shown. In FIG. 5A, the third and fourth pages are selected in the thumbnail display area 402 and the third and fourth pages are displayed in the photo album display area 403. On the third and fourth pages, photo slots 511 and 512 are arranged and to the photo slot 511, a photo A is allocated, and to the photo slot 512, a photo B is allocated, respectively. Further, on the third and fourth pages, a text display area 510 is arranged. The text display area 510 is a text box and text, such as "My Album", is already set. By a user selecting the text display area 510, a text input dialog 520 is displayed as shown in FIG. 5B. In the text input dialog 520, a text input area (also called a text editing area or a text box) 521 and menu items 522 to 524 are arranged. The text input area 521 is a text box and within the text box, the text (here, "My Album") that is set in the text display area 510 is displayed. A caret 525 within the text input area 521 is an object that indicates the input position of text. By bringing the text input area 521 into focus by clicking or tapping, it is made possible to input text and to edit text in the text input area 521. In a terminal, such as a smartphone and a tablet, to which no keyboard is connected, in a case when the text input area 521 is brought into focus, a software keyboard 530 is displayed as will be described later.

In the menu item 522, it is possible to set the character size. In the example shown in FIG. 5B, it is possible to select the character size from among three sizes, that is, "small", "middle", and "large". In the example shown in FIG. 5B, as the character size, "large" is selected. In the menu item 523, it is possible to set the arrangement of text. Specifically, it is possible to set how to arrange text within the text display area 510. In the example shown in FIG. 5B, it is possible to select the arrangement of text from three arrangements, that is, "left", "centered", and "right". In the example shown in FIG. 5B, as the arrangement of text, "left" is selected. In the menu item 524, it is possible to set the character color. An area 526 of the menu item 524 is painted out in the character color currently being set. By clicking or tapping the area 526, a palette of character colors that can be set is displayed. Then, a user selects a desired character color from the palette. In the text input dialog 520, an OK button 527 and a Cancel button 528 are further arranged. In a case when the OK button 527 is pressed, the contents that are input and edited in the text input area 521 and the contents that are set in the menu items 522 to 524 are reflected in the text display area 510 and the text input dialog 520 closes. In the case when the Cancel button 528 is pressed, the contents that are input and edited in the text input area 521 and the contents that are set in the menu items 522 to 524 are not reflected in the text display area 510 and the text input dialog 520 closes.

Figure 5D:
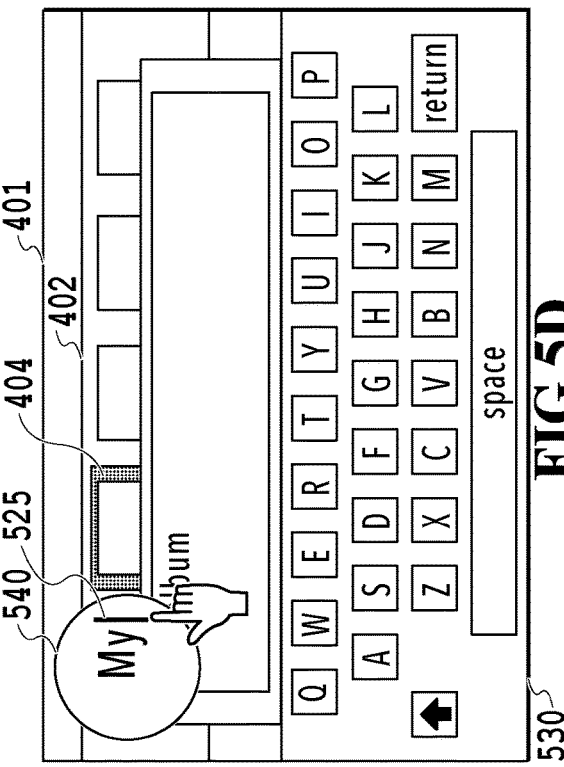
Figure 5C:
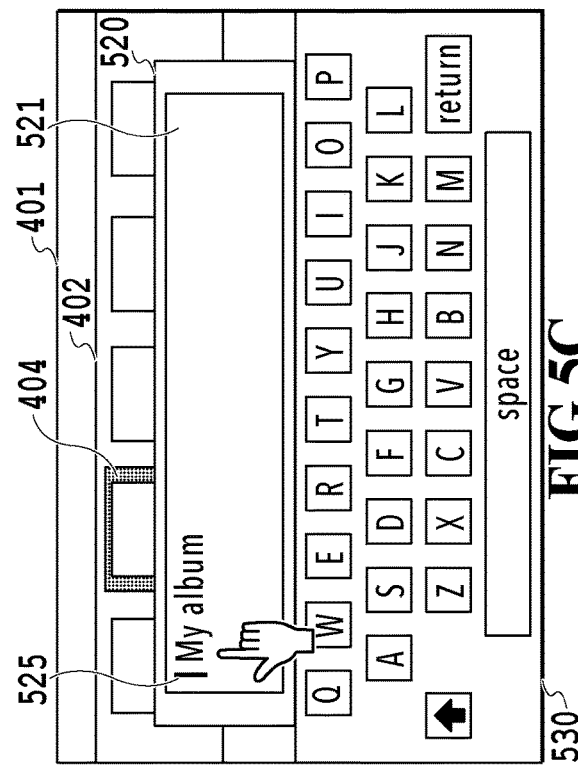

In FIG. 5B, in the case when the text input area 521 is brought into focus, as shown in FIG. 5C, the software keyboard 530 is displayed. In the present embodiment, the Photo Album Creator 80 moves the display position of the text input dialog 520 downward (downward in FIGS. 5A to 5D) compared to that in FIG. 5B, as shown in FIG. 5C, in the stage of displaying the software keyboard 530. The reason to change the display position as above is to prevent a magnifying lens 540 from extending off the display panel of the LCD 205 in the case when the magnifying glass 540 is displayed. Normally, the magnifying glass 540 is displayed above the text portion that is pressed for a long time and the display position thereof cannot be adjusted. Because of this, in the case when the magnifying glass 540 is displayed in the state where the text input area 521 is located at the top end of the display panel, as shown in FIG. 5B, there is a possibility that the magnifying glass 540 extends off the display panel. Consequently, in the present embodiment, as shown in FIG. 5C, the display position of the text input dialog 520 is moved downward. Due to this, as shown in FIG. 5D, the magnifying glass 540 comes to be displayed in a visually recognizable area.

Figure 6:
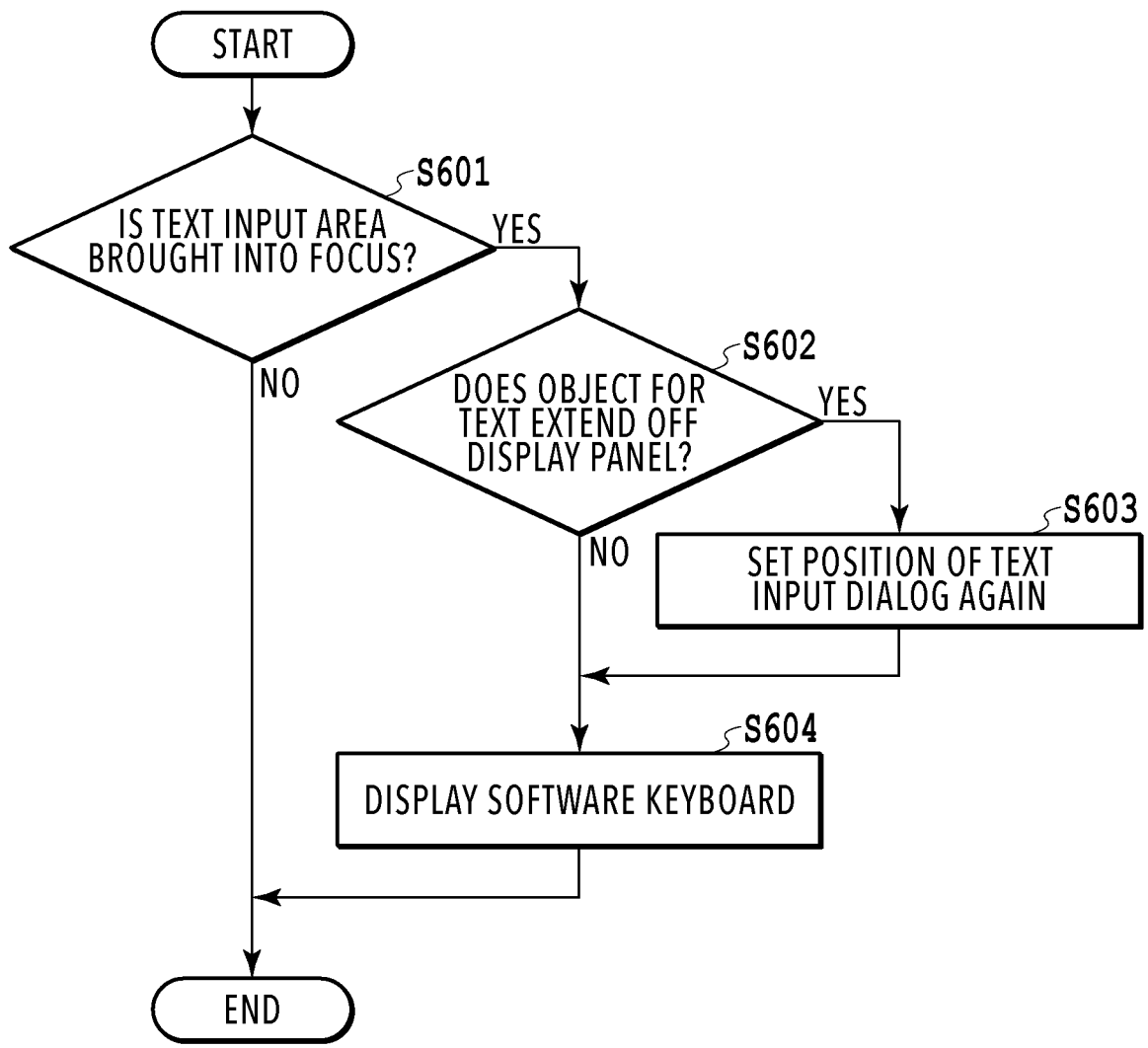
FIG. 6 is a flowchart showing an operation of a photo album creation application in a first embodiment.

FIG. 6 is a flowchart showing the operation of the Photo Album Creator 80 in the first embodiment in the case when the text input area 521 is brought into focus. Representation such as "the Photo Album Creator performs processing" is used, but specifically, each step is performed by the CPU 204 of the PC 1 performing processing in accordance with the Photo Album Creator. The processing in FIG. 6 is performed after the text input dialog 520 is displayed at the predetermined position in the display area as shown in FIG. 5B.

First, the Photo Album Creator 80 determines whether or not the text input area 521 is brought into focus (step S601). The processing at step S601 is performed by periodically or intermittently repeating determination of whether a user has operated the text input area 521 (for example, touch operation or click operation). The case of being brought into focus can also be said in other words, such as the case when the text input area becomes the target of operation. In the case when the text input area 521 is brought into focus (YES at step S601), the processing advances to step S602. In the case when the text input area 521 is not brought into focus (NO at step S601), the processing terminates.

At step S602, the Photo Album Creator 80 determines whether or not the object for text (here, the magnifying glass 540 shown in FIG. 5D) is displayed appropriately. Being displayed appropriately means being displayed in a visually recognizable area. Whether or not the object for text is displayed appropriately may be determined by determining whether or not the entire object for text extends off the display panel. For example, the Y coordinate of the bottommost end of the magnifying glass 540 (coordinate in the vertical direction in FIG. 5D) and the Y coordinate of the top end of the display panel are compared. Then, in the case when the comparison indicates that the Y coordinate of the bottommost end of the magnifying glass 540 is arranged above the top end of the display panel, it is determined that the entire magnifying glass 540 extends off the display panel. It may also be possible to determine whether or not the object for text is displayed appropriately by determining whether or not part of the object for text extends off the display panel. For example, the Y coordinate of the topmost end of the magnifying glass 540 (coordinate in the vertical direction in FIG. 5D) and the Y coordinate of the top end of the display panel are compared. Then, in the case when the comparison indicates that the Y coordinate of the topmost end of the magnifying glass 540 is arranged above the top end of the display panel, it is determined that part of the magnifying glass 540 extends off the display panel. Further, in place of determining whether or not the object for text extends off the display panel, it may also be possible to determine whether or not the object for text extends off the display area 401 of the Photo Album Creator 80. In the case when it is determined that the object for text is not displayed appropriately (YES at step S602), the processing advances to step S603. In the case when it is determined that the object for text is displayed appropriately (NO at step S602), the processing advances to step S604.

At step S603, the Photo Album Creator 80 sets again the position of the text input dialog 520 at the position at which the object for text is displayed appropriately. Specifically, position setting, to move the display position of the text input dialog displayed at the predetermined position as shown in FIG. 5B downward so that the display position will be as shown in FIG. 5C, is performed. In the case when the display position of the text input dialog 520 is set again, the processing advances to step S604. In the present embodiment, the example is explained in which in the case when text is operated, the magnifying glass is displayed above the text, and, therefore, the text input dialog 520 is moved downward. However, it may also be possible to change the movement direction of the text input dialog 520 depending on the position at which the magnifying glass is displayed. That is, in the case when operating the text causes the magnifying glass to be displayed on the left side of the text, it is determined that the text input area is brought into focus, and, therefore, the text input dialog 520 is moved rightward.

At step S604, the Photo Album Creator 80 displays the software keyboard 530.

Further, in FIG. 6, in the case when the determination results are Yes at step S601 and step S602, step S603 is performed, but in the case when the determination results are Yes at step S601, step S603 may be performed without performing the determination at step S602. That is, in the case when the text box becomes the operation target in response to the operation for the text box, the display position of the text input dialog 520 may be moved so as to prevent at least part of the object for text from being hidden.

Here, processing, after step S603 and step S604 are performed, is explained. After step S603 and step S604, the determination at step S601 is performed again. Then, in the case when the determination results at step S601 are No (that is, in the case when the operation for the text box has been completed), the Photo Album Creator 80 may return the display position of the text input dialog 520 to the initial display position.

As above, in the present embodiment, the display position of the text input dialog is adjusted so that the magnifying glass that is displayed by the function of the OS is displayed within the display panel. Due to this, even in the case when a long-pressing operation is performed in any place within the text input area, it is made possible to display at least part of the magnifying glass within the display panel. Consequently, according to the present embodiment, it is possible to display the magnifying glass in an area in which a user can visually recognize the magnifying glass.

Because of the above, it is possible to improve usability at the time of text editing performed on the user interface of the application.

Second Embodiment

In a smartphone or a tablet, there is a case when a control (also called an indicator) is displayed at the start point and the end point of a selected range by the function of the OS at the time of a user selecting part of or all text being displayed on the display panel. The control is an object for text that is displayed in the case when text is selected and that is used in the case when a user specifies a selected range of text, and the like. In the present embodiment, the case is explained where the Photo Album Creator is run in a smartphone or a tablet in which an OS having a function to display a control is installed. The configuration of the PC 1 in the second embodiment is the same as that in the first embodiment, and, therefore, an explanation is omitted.

As described above, in a smartphone or a tablet to which no physical keyboard is connected, in the case when the text input area within the text input dialog is brought into focus by a user trying to input text, a software keyboard is displayed from the lower side of the display panel. In the case when the software keyboard overlaps the position at which a user tries to input text, the text that a user tries to input is hidden by the software keyboard. Because of this, a method of moving the entire user interface upward so that the portion at which text is input is visible has been proposed. However, there is a case when the object for text, such as a control, which is displayed under the text is hidden by the software keyboard even though the entire user interface is moved upward so that the portion at which the text is input is visible. Consequently, the Photo Album Creator 80 in the present embodiment moves the entire user interface upward by taking the control into consideration.

Figure 7A:
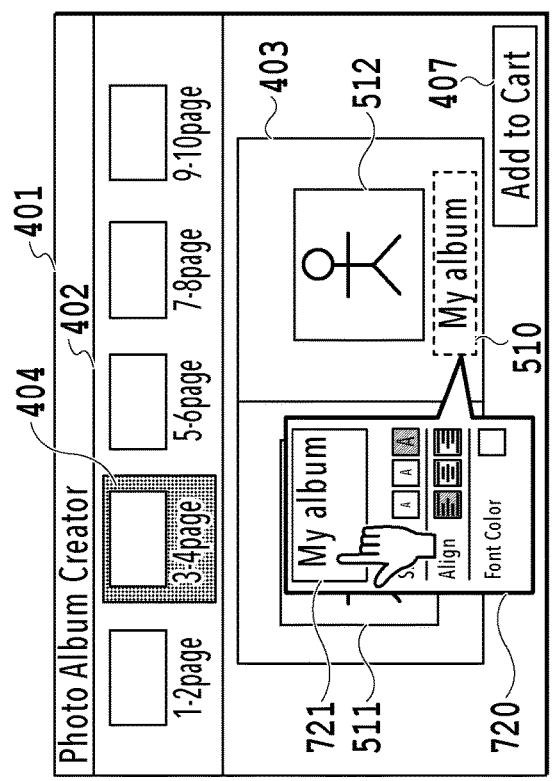
FIGS. 7A to 7C are diagrams for explaining a relationship of the display position between a control and the software keyboard.
Figure 7B:
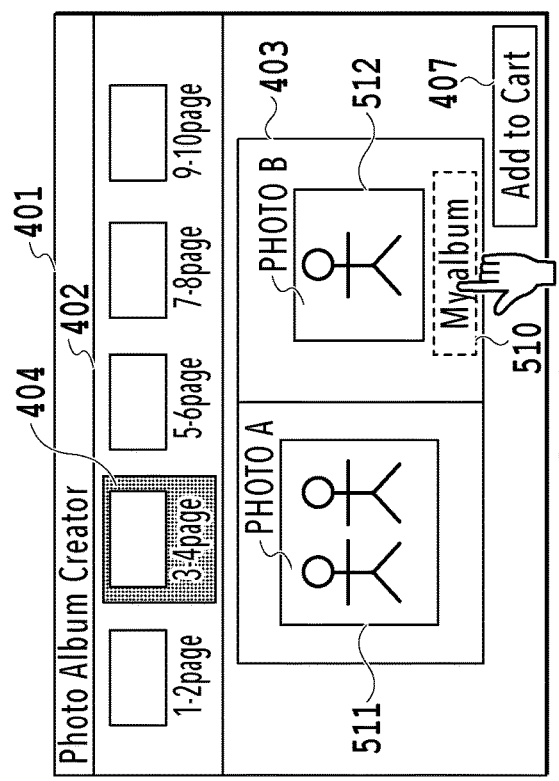
Figure 7C:
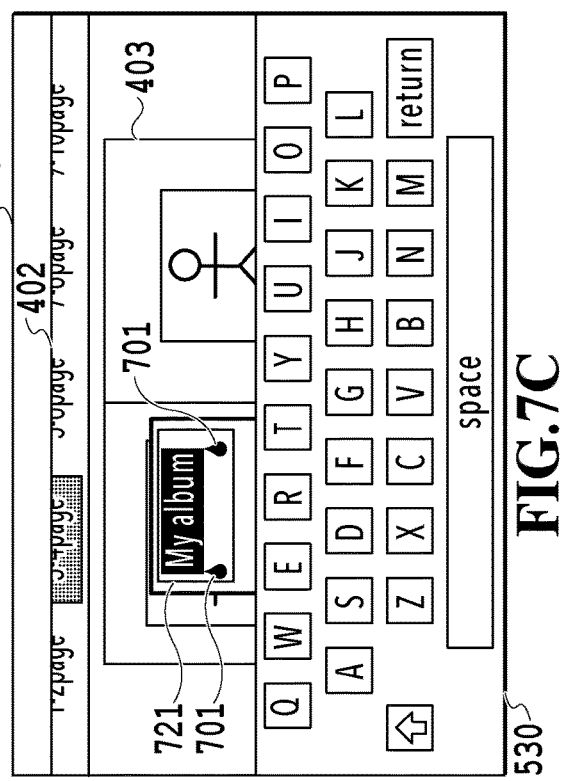

FIGS. 7A to 7C are diagrams for explaining a relationship of the display position between the control and the software keyboard. In FIGS. 7A to 7C, the way a user inputs text to a photo album is shown. Here, the case is taken as an example where the Photo Album Creator 80 displays a balloon-type text input dialog 720 as shown in FIG. 7B. In the case when text is input to a text input area 721 of the balloon-type text input dialog 720, the input text is reflected in the text display area 510 real time. As described above, by reflecting the contents input to the text input area 721 in the text display area 510 real time, it is made possible for a user to edit text while checking how the text is displayed in the actual photo album.

In the case when the text input area 721 is brought into focus in the state shown in FIG. 7B, the software keyboard 530 is displayed as shown in FIG. 7C. At this time, there is a possibility that the portion at which text is input is hidden by the software keyboard 530 depending on the display position of the software keyboard 530. Because of this, the Photo Album Creator 80 moves the entire user interface upward (upward in FIG. 7C) as shown in FIG. 7C at the time of displaying the software keyboard 530. In FIG. 7C, it is known that the thumbnail display area 402 and the photo album display area 403 are displayed above, as compared to those in FIG. 7B. Further, in the present embodiment, as described above, the Photo Album Creator 80 controls the position of the user interface so that the control 701 is also not hidden by the software keyboard 530, in addition to the text being input. Specifically, the Photo Album Creator 80 provides a gap that takes into consideration the height (length in the vertical direction in FIG. 7C) of the control 701 between the bottom end of the text input area 721 and the top end of the software keyboard 530. By taking into consideration the height of the control 701 as described above, for example, even in the case when the control 701 located at the bottom end of the text input area 721 is moved one row downward by a user, it is possible to reduce that the controls overlap the software keyboard. Further, even in the case when the character displayed at the bottommost portion of the text input area 721 is specified as the start point or the end point of the selected range, it is made possible for a user to easily operate the control 701 because the control 701 does not overlap the software keyboard 530. The control 701 plays an important role in text editing. Consequently, by performing control so that not only the text being input, but also, the control 701 is not hidden by the software keyboard 530 as described above, it is possible to improve usability at the time of text editing.

Figure 8:
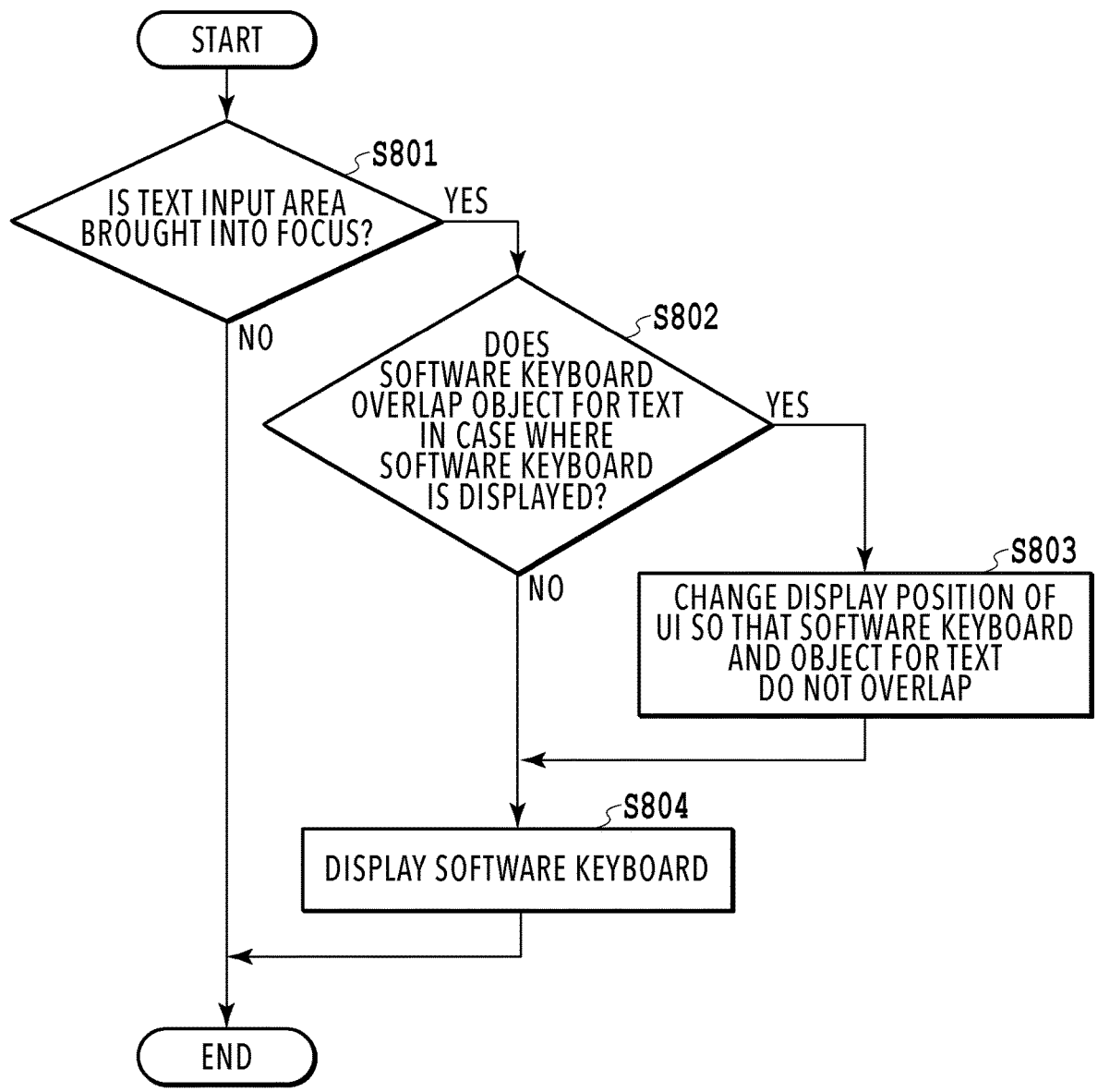
FIG. 8 is a flowchart showing an operation of a photo album creation application in a second embodiment.

FIG. 8 is a flowchart showing the operation of the Photo Album Creator 80 in the second embodiment in the case when the text input area 721 is brought into focus. The processing in FIG. 8 is performed after the text input dialog 720 is displayed at the predetermined position in the display area as shown in FIG. 7B. First, the Photo Album Creator 80 determines whether or not the text input area 721 is brought into focus (step S801). The processing at step S801 is performed by periodically or intermittently repeating the determination of whether or not a user has operated the text input area (for example, touch operation or click operation). In the case when the text input area 721 is brought into focus (YES at step S801), the processing advances to step S802. In the case when the text input area 721 is not brought into focus (NO at step S801), the processing terminates.

After displaying the software keyboard 530 at step S802, the Photo Album Creator 80 determines whether or not the software keyboard 530 overlaps the object for text (here, the control 701). For example, the coordinate of the bottom end of the text input area 721 and the coordinate of the top end of the software keyboard 530 are compared. Then, in the case when there is not a gap whose height is greater than or equal to the height of the object for text between the bottom end of the text input area 721 and the top end of the software keyboard 530, the Photo Album Creator 80 determines that the software keyboard 530 and the object for text overlap. In the case when it is determined that they overlap (YES at step S802), the processing advances to step S803. In the case when it is determined that they do not overlap (NO at step S802), the processing advances to step S804.

At step S803, the Photo Album Creator 80 changes the display position of the user interface so that the software keyboard 530 and the object for text do not overlap. For example, the Photo Album Creator 80 changes the display position of the text input area 721 so that a gap whose height is greater than or equal to the height of the object for text is produced between the bottom end of the text input area 721 and the top end of the software keyboard 530. Due to this, it is possible to display the object for text in an area other than the display area of the software keyboard 530. After the display position of the user interface is changed, the processing advances to step S804.

At step S804, the Photo Album Creator 80 displays the software keyboard 530.

Further, in FIG. 8, in the case when the determination results are Yes at step S801 and step S802, step S803 is performed, but step S803 may be performed without performing the determination at step S802 in the case when the determination results are Yes at step S801.

Furthermore, in the case when the processing at step S801 is performed again after step S803 and the determination results are No at step S801, the Photo Album Creator 80 may return the display position of the text input dialog 720 to the initial display position.

As above, in the present embodiment, the display position of the user interface is adjusted so that the control that is displayed by the function of the OS at the time of performing text selection is not hidden by the software keyboard even in the case when the software keyboard is displayed. Due to this, even in the state when the software keyboard is displayed, it is made possible for a user to appropriately perform text selection. Consequently, according to the present embodiment, it is possible to improve usability at the time of text editing performed on the user interface of the application.

In the present embodiment, the display position of not only the sub dialog (text input dialog 720), but also, the main dialog (the portion except for the title bar of the screen of the Photo Album Creator shown in FIG. 4, that is, the portion below the area 402) is changed. However, it may also be possible to move only the text input dialog as in the first embodiment. Further, in the first embodiment, it may also be possible to move both the sub screen and the main screen above the display panel as in the present embodiment. That is, as long as it is possible to display the object for text in a visually recognizable area, the display position of the user interface may be changed in any aspect.

Further, in the present embodiment, the processing to change the display position of the user interface of the Photo Album Creator 80 by taking the control into consideration is explained. However, it may also be possible to change the display position of the user interface of the Photo Album Creator 80 by also taking into consideration the magnifying glass explained in the first embodiment along with the control. That is, it may also be possible to change the display position of the user interface of the Photo Album Creator 80 by combining the first embodiment and the second embodiment. That is, the Photo Album Creator 80 displays the user interface in the range in which the magnifying glass does not extend off the display panel and the control does not overlap the software keyboard. On the other hand, in the case when both the conditions are not satisfied at the same time, priority is given to one of the conditions. That is, in the case when moving the user interface upward by taking the control into consideration causes the magnifying glass to extend off the display panel, it may also be possible to move the user interface in the range in which the magnifying glass is included within the display panel. Further, for example, in the case when moving the user interface downward by taking into consideration the magnifying glass causes the control to be hidden by the software keyboard, it may also be possible to move the user interface up to the position at which the control does not overlap the software keyboard.

In the present embodiment, the case is taken as an example where the Photo Album Creator 80 displays the balloon-type text input dialog 720. However, it may also be possible to display the text input dialog 520 in the case when the text display area 510 is selected, as in the first embodiment. Further, in the first embodiment, as in the present embodiment, it may also be possible to display the balloon-type text input dialog 720.

Third Embodiment

In the example shown in FIG. 7C, the control 701 is displayed without being hidden by the software keyboard 530, but the text display area 510 is hidden by the software keyboard 530. In such a case, it is no longer possible for a user to check the contents of the text display area 510 real time while editing text in the balloon-type text input dialog 720. Consequently, the Photo Album Creator 80 in the present embodiment moves the user interface further upward so that the text display area 510 is not hidden by the software keyboard at the time of moving the user interface upward.

The configuration of the PC 1 in the present embodiment is the same as that in the first and second embodiments, and, therefore, an explanation is omitted. Further, the operation of the PC 1 in the present embodiment is the same as that in the second embodiment. However, the processing at step S803 is different. In the following, the processing at step S803 in the present embodiment is explained.

Figure 9A:
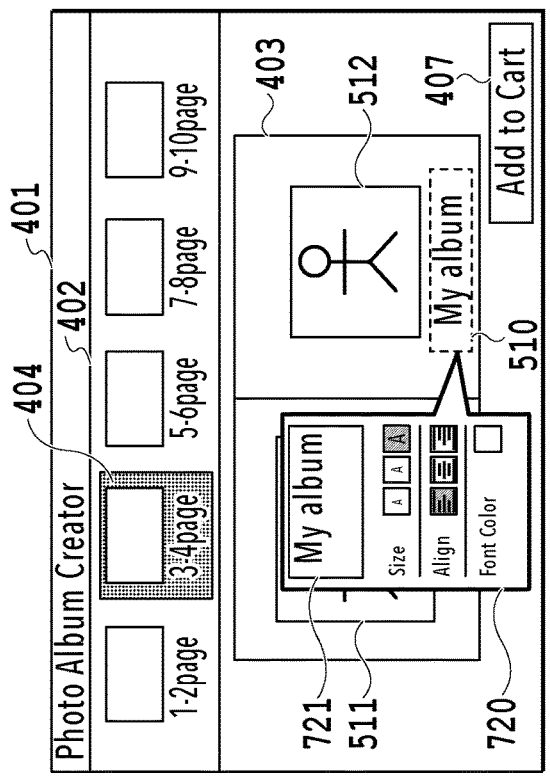
FIGS. 9A to 9C are diagrams for explaining a relationship of the display position between a text slot and the software keyboard.
Figure 9B:
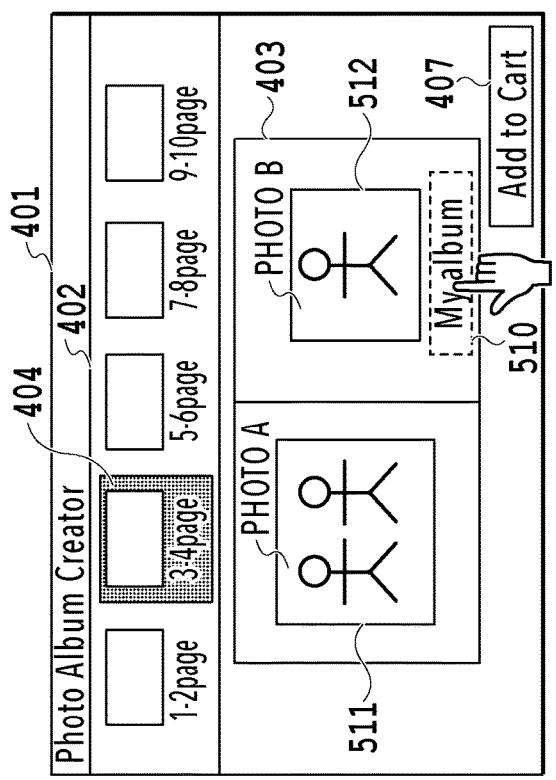
Figure 9C:
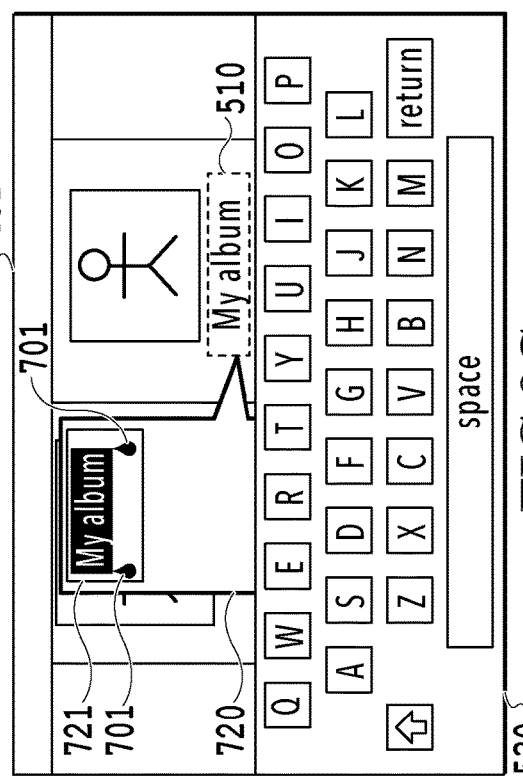

FIGS. 9A to 9C are diagrams for explaining a relationship of the display position between the text display area and the software keyboard of the Photo Album Creator 80. In FIGS. 9A to 9C, the way a user inputs text to the photo album is shown. FIGS. 9A and 9B are the same as FIGS. 7A and 7B, respectively.

In the processing at step S803, the Photo Album Creator 80 moves the user interface further upward than the state shown in FIG. 7C so that the text display area 510 is not hidden by the software keyboard 530, as shown in FIG. 9C. Consequently, in FIG. 7C, the text display area 510 is hidden, but, in FIG. 9C, the text display area 510 is seen. Due to this, even in the state where the software keyboard 530 is displayed, it is made possible for a user to check the contents of the text display area 510 that is updated real time during text editing.

In FIG. 9B, in the case when the entire user interface is moved upward, there is a possibility that the text input area 721 extends off the display panel. Consequently, as shown in FIG. 9C, the Photo Album Creator 80 adjusts the display position of the text input dialog 720 so that the text input area 721 does not extend off the display panel at the time of moving the entire user interface upward. Further, in the case when there is a possibility that the magnifying glass is displayed, it is sufficient for the Photo Album Creator 80 to adjust the display position of the text input dialog 720 by also taking the magnifying glass into consideration as in the first embodiment.

As above, according to the present embodiment, even in the case when the software keyboard is displayed at the time of text editing in the balloon-type text input dialog, it is made possible to check the contents of the text display area 510 in real time. Consequently, it is possible to further improve usability at the time of text editing performed on the balloon-type text input dialog.

In each of the embodiments described above, the display position of the user interface is controlled at the time of displaying the software keyboard. However, the timing at which the display position of the user interface is controlled may be different timing, such as timing at which the text display area is selected.

Other Embodiments

In the first, second, and third embodiments, an explanation is given by taking the magnifying glass and the control as examples of the objects for text, but, of course, the processing of the present application may be performed in order to appropriately display an object other than the magnifying glass and the control. For example, the processing of the present application may be performed at the time of displaying a copy object to copy text or a cut-out object to cut out text.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the present invention, it is possible to improve usability at the time of text editing performed on a user interface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed:

1. An information processing apparatus capable of displaying a software keyboard on a display screen, the information processing apparatus comprising:
   (a) one or more processors; and
   (b) one or more memories storing instructions that, when executed by the one or more processors, cause the information processing apparatus:
   (i) to select a template that includes an image area to which image data is assigned and a text area to which text data is assigned;
   (ii) to arrange the image data in the image area of the selected template;
   (iii) to display a text input area for inputting text corresponding to the text area on the display screen;
   (iv) to assign text inputted in the text input area using the software keyboard to the text area of the selected template;
   (v) to display a layout result in which the image data is arranged in the image area and the text is arranged in the text area on the display screen, wherein the text area is displayed at a predetermined position; and
   (vi) to perform display control processing to change the text area of the layout result from the predetermined position to a position that does not overlap with the software keyboard in a case when the software keyboard is displayed on the display screen.

2. The information processing apparatus according to claim 1, wherein the display control processing is performed so that an object for text indicating that the text displayed in the text input area is selected does not overlap with the software keyboard.

3. The information processing apparatus according to claim 2, wherein the object for text indicates a start point and an end point of a selected range of the text.

4. The information processing apparatus according to claim 1, wherein a display position of the text area on the display screen is changed from a first display position to a second display position in order to display the text area of the layout result in the position that does not overlap with the software keyboard.

5. The information processing apparatus according to claim 1, wherein a display position of the text input area on the display screen is changed from a third display position to a fourth display position in order to display the text area of the layout result in the position that does not overlap with the software keyboard.

6. The information processing apparatus according to claim 1, wherein a text dialogue that includes the text input area is displayed on the display screen, and the text dialogue displays the text input area, a text size item for designating text size, and a color designation item for designating text color in parallel.

7. An information processing method in an information processing apparatus capable of displaying a software keyboard on a display screen, the method comprising:

selecting a template that includes an image area to which image data is assigned and a text area to which text data is assigned;

arranging the image data in the image area of the selected template;

displaying a text input area for inputting text corresponding to the text area on the display screen;

assigning text inputted in the text input area using the software keyboard to the text area of the selected template;

displaying a layout result in which the image data is arranged in the image area and the text is arranged in the text area on the display screen, wherein the text area is displayed at a predetermined position; and performing display control processing to change the text area of the layout result from the predetermined position to a position that does not overlap with the software keyboard in a case when the software keyboard is displayed on the display screen.

8. The information processing method according to claim 7, wherein the display control processing is performed so that an object for text indicating that the text displayed in the text input area is selected does not overlap with the software keyboard.

9. The information processing method according to claim 8, wherein the object for text indicates a start point and an end point of a selected range of the text.

10. The information processing method according to claim 7, wherein a display position of the text area on the display screen is changed from a first display position to a second display position in order to display the text area of the layout result in the position that does not overlap with the software keyboard.

11. The information processing method according to claim 7, wherein a display position of the text input area on the display screen is changed from a third display position to a fourth display position in order to display the text area of the layout result in the position that does not overlap with the software keyboard.

12. The information processing method according to claim 7, wherein a text dialogue that includes the text input area is displayed on the display screen, and the text dialogue displays the text input area, a text size item for designating text size, and a color designation item for designating text color in parallel.

13. A non-transitory computer readable storage medium storing a program that causes a computer to execute an information processing method, the method comprising the steps of:

selecting a template that includes an image area to which image data is assigned and a text area to which text data is assigned;

arranging the image data in the image area of the selected template;

displaying a text input area for inputting text corresponding to the text area on the display screen;

assigning text inputted in the text input area using the software keyboard to the text area of the selected template;

displaying a layout result in which the image data is arranged in the image area and the text is arranged in the text area on the display screen, wherein the text area is displayed at a predetermined position; and performing display control processing to change the text area of the layout result from the predetermined position to a position that does not overlap with the software keyboard in a case when the software keyboard is displayed on the display screen.

\* \* \* \* \*